United States Patent [19]

Loper et al.

[11] Patent Number: 5,765,191
[45] Date of Patent: Jun. 9, 1998

[54] METHOD FOR IMPLEMENTING A FOUR-WAY LEAST RECENTLY USED (LRU) MECHANISM IN HIGH-PERFORMANCE

[75] Inventors: Albert John Loper, Cedar Park; Soummya Mallick, Austin; Rajesh Bhikhubhai Patel, Austin; Michael Putrino, Austin, all of Tex.

[73] Assignee: International Business Machines Corporation, Armonk, N.Y.

[21] Appl. No.: 641,060

[22] Filed: Apr. 29, 1996

[51] Int. Cl.$^6$ ............................................. G06F 12/12
[52] U.S. Cl. ........................................ 711/136; 711/144
[58] Field of Search ............................. 395/460, 461, 395/463, 485, 486, 487, 478; 711/133, 134, 136, 158, 159, 160, 151

[56] References Cited

U.S. PATENT DOCUMENTS 4,607,331  8/1986  Goodrich, Jr. et al. ............... 711/136
5,638,531  6/1997  Crump et al. ......................... 711/123

Primary Examiner—Eddie P. Chan
Assistant Examiner—Kevin L. Ellis
Attorney, Agent, or Firm—Richard A. Henkler; Antony P. Ng; Andrew J. Dillon

[57] ABSTRACT

A method for implementing a four-way least recently used cache line replacement scheme in a four-way cache memory is disclosed. The cache memory includes multiple cache lines, and each cache line includes four congruence sets. In accordance with the present disclosure, a 5-bit Least Recently Used (LRU) field is associated with each of the cache lines within the cache memory. For a particular cache line, a set number of a least recently used set among the four congruence sets is stored in any two bits of the LRU field associated with that cache line. Next, a set number of the second least recently used set among the four congruence sets is stored in another two bits of the same LRU field associated with the same cache line. Finally, a last bit of the 5-bit LRU field is set to a specific state in response to a determination of which one of the remaining two sets is the second most recently used set.

8 Claims, 4 Drawing Sheets

|  | LRU | LRU + 1 | MRU - 1 | MRU |
|---|---|---|---|---|
| cycle a | 1 | (0) | 2 | 3 |
| cycle b | 1 | 2 | 3 | (0) |
| cycle c | 1 | 2 | (3) | 0 |
| cycle d | (1) | 2 | 0 | 3 |
| cycle e | 2 | 0 | 3 | 1 |
( ) = access
*Fig. 3*
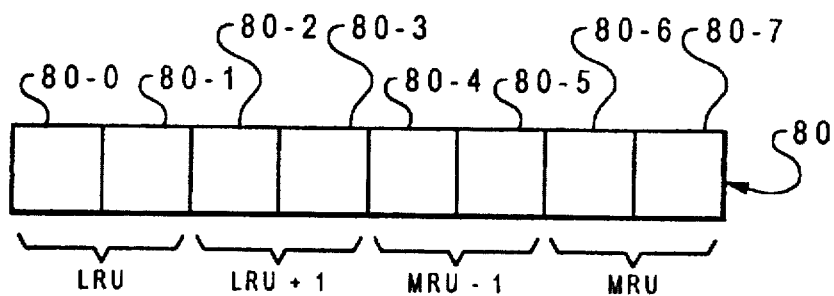
*Fig. 4a*
*Prior Art*
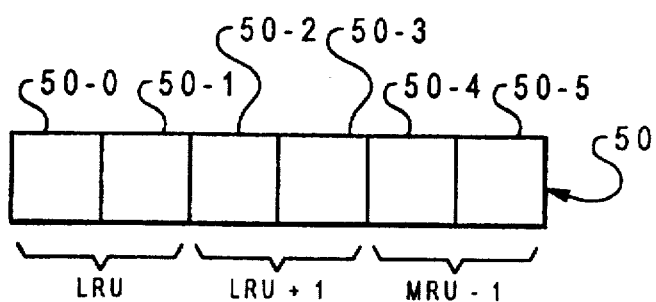
*Fig. 4b*
*Prior Art*
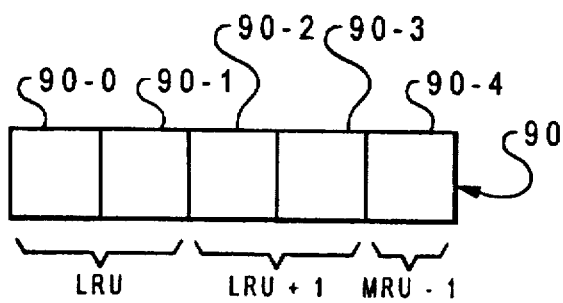
*Fig. 5*

| CASE 1 | 0 | 0 | 0 | 1 | 1 | LRU = "00" ; LRU + 1 = "01" ; MRU - 1 = "11"<br>(MRU = "10") |
| CASE 2 | 0 | 0 | 0 | 1 | 0 | LRU = "00" ; LRU + 1 = "01" ; MRU - 1 = "10"<br>(MRU = "11") |
| CASE 3 | 1 | 1 | 0 | 1 | 1 | LRU = "11" ; LRU + 1 = "01" ; MRU - 1 = "10"<br>(MRU = "00") |
| CASE 4 | 1 | 1 | 1 | 0 | 0 | LRU = "11" ; LRU + 1 = "10" ; MRU - 1 = "00"<br>(MRU = "01") |

Fig. 6

METHOD FOR IMPLEMENTING A FOUR-WAY LEAST RECENTLY USED (LRU) MECHANISM IN HIGH-PERFORMANCE

BACKGROUND

1. Technical Field

The present disclosure relates to a method for improving data processing in general and, in particular, to a method of implementing a Least Recently Used (LRU) mechanism in a cache memory within a data processing system. Still more particularly, the present disclosure relates to a method for implementing a four-way LRU mechanism in a four-way cache memory within a high-performance data processing system.

2. Description of the Related Art

A high-performance data processing system typically includes both a system memory and a cache memory. A cache memory is a small and relatively high-speed memory interposed between a processor and the system memory. Information such as data or instruction may be copied from a portion of the system memory into the cache memory so that the information will be available to the processor in a relatively short amount of time.

However, if the information requested by the processor cannot be found in the cache memory—a cache miss—the required information must be obtained from the system memory. In addition to the immediate usage by the processor, a copy of such information will also be placed into the cache memory for future usage. Thus, when the cache memory is completely filled, some information already stored in the cache memory may have to be replaced. Accordingly, it is important to have a strategy to decide what information that is already in the cache memory needs to be discarded in order to make room for the new information. Least Recently Used (LRU) is a strategy commonly employed for selecting a cache line in which the information needs to be replaced when there is a cache miss. This is because statistical data has shown that for low associative caches (caches that are configured as less than or equal to four ways), a true LRU scheme minimizes the cache miss ratio compared to other strategies, such as random replacement.

The implementation of a two-way LRU mechanism in a two-way cache memory is quite trivial in that it requires only one bit of information per cache line. However, the implementation of a four-way LRU mechanism in a four-way cache memory requires a larger number of bits. Some implementations utilize eight bits ($Nlog_2N$, where N=number of ways of the cache memory) to store essential information such as the Most Recently Used (MRU) way and the LRU way. Other implementations of the four-way cache memory utilize six bits (($N-1)log_2N$)) to store similar essential information. This disclosure provides a method for implementing the four-way LRU mechanism in a high-performance data processing system with fewer bits than the prior art implementations.

SUMMARY

It is therefore an object of the present disclosure to provide an improved method for implementing a Least Recently Used (LRU) mechanism in a cache memory within a data processing system.

It is another object of the present disclosure to provide an improved method for implementing a four-way LRU mechanism in a cache memory within a data processing system.

It is yet another object of the present disclosure to provide an improved method for implementing a four-way LRU mechanism within a high-performance data processing system with a reduced number of bits without sacrificing cycle time or performance.

In accordance with the present disclosure, a method of implementing a least recently used cache line replacement scheme in a cache memory having units of information by utilizing less than $(N-1)log_2N$ bits, where N is the number of units (or congruence sets) within the cache memory, is disclosed.

Further, the implementation of a four-way least recently used cache line replacement scheme in a four-way cache memory is illustrated. The four-way cache memory includes multiple cache lines, and each cache line includes four congruence sets. In accordance with the present disclosure, a five-bit Least Recently Used (LRU) field is associated with each of the cache lines within the cache memory. For a particular cache line, a set number of a least recently used set among the four congruence sets is stored in any two bits of the LRU field associated with that cache line. Next, a set number of the second least recently used set among the four congruence sets is stored in another two bits of the same LRU field associated with the same cache line. Finally, a last bit of the five-bit LRU field is set to a specific state in response to a determination of which one of the remaining two sets is the second most recently used set.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative disclosure when read in conjunction with the accompanying drawings, wherein:

FIG. 3 is a depiction of an example of a true LRU scheme;

FIG. 4a is an illustration of a prior art implementation of a four-way LRU field by utilizing eight bits;

FIG. 4b is an illustration of a prior art implementation of a four-way LRU field by utilizing six bits;

FIG. 5 is an illustration of an implementation of a four-way LRU field according to an illustrative embodiment of the present disclosure; and FIG. 6 is a depiction of some examples for illustrating the application of the four-way LRU mechanism according to an illustrative embodiment of the disclosure.

DETAILED DESCRIPTION OF AN ILLUSTRATIVE EMBODIMENT

An illustrative embodiment under the present disclosure may be implemented on a variety of processors and cache-based data processing systems. For the purpose of illustration, an illustrative embodiment as described below is implemented on one of the PowerPC™ line of microprocessors manufactured by International Business Machines Corporation, which operates according to reduced instruction set computing (RISC) techniques.

Figure 1:
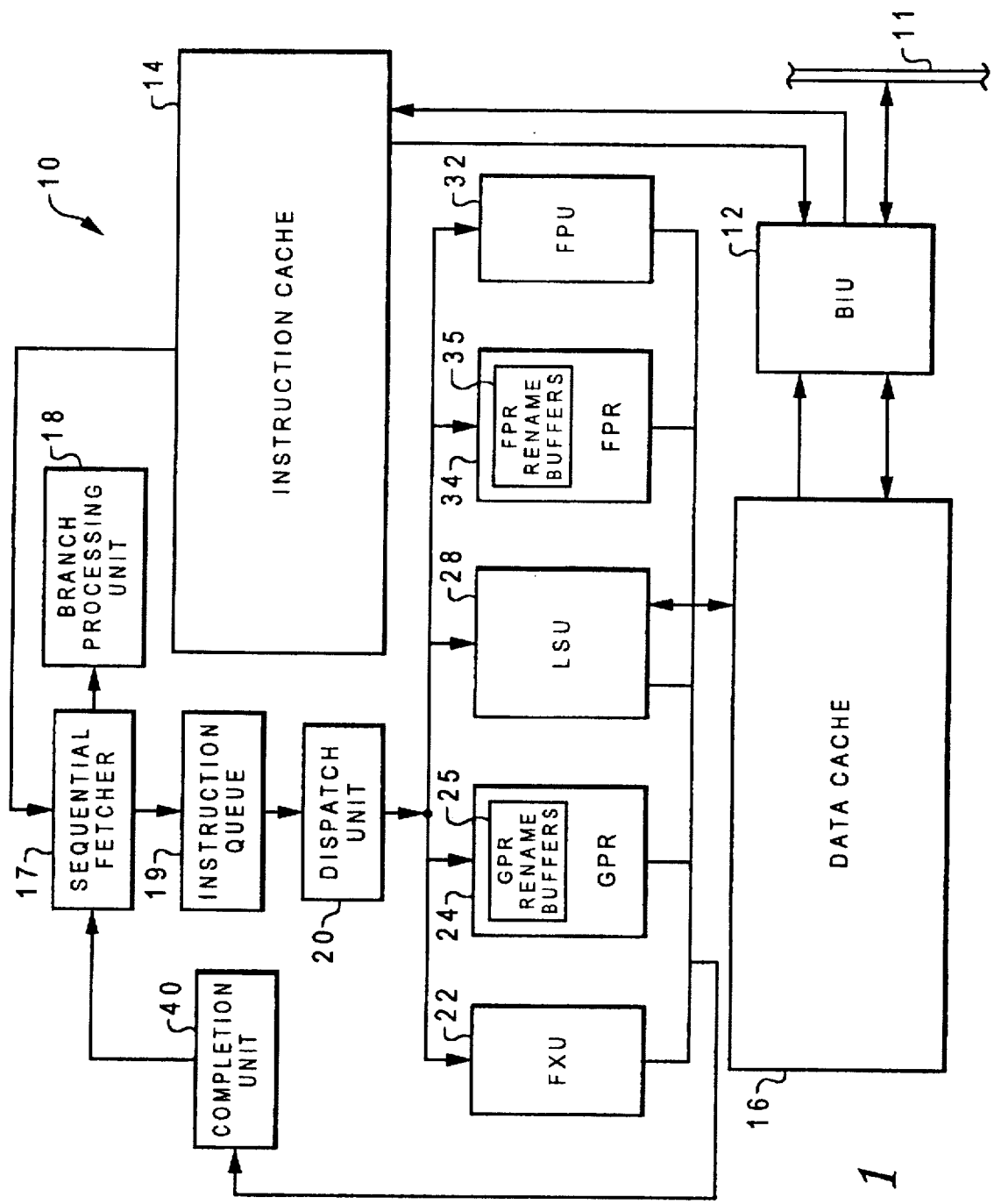
FIG. 1 is a block diagram of an illustrative embodiment of a processor which utilizes the method of the present disclosure.

Referring now to the drawings and in particular to FIG. 1, there is illustrated a block diagram of a processor 10 for data processing. In an illustrative embodiment of the present disclosure, processor 10 is a single integrated circuit superscalar microprocessor, comprising various registers, buffers, execution units, and functional units. As depicted in FIG. 1, processor 10 is coupled to system bus 11 via a bus interface unit (BIU) 12 within processor 10. BIU 12 controls the transfer of information between processor 10 and other devices, such as a main memory (not shown), that are coupled to system bus 11. Processor 10, system bus 11, and the other devices coupled to system bus 11 together form a host data processing system.

Within processor 10, BIU 12 is connected to instruction cache 14 and data cache 16, in both of which an illustrative embodiment of the present disclosure may be incorporated. Both instruction cache 14 and data cache 16 are high-speed caches which enable processor 10 to achieve a relatively fast access time to a subset of instructions or data previously transferred from main memory to caches 14 and 16, thus improving the speed of operation of the host data processing system. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the execution circuitry of processor 10 includes three execution units, namely fixed-point unit (FXU) 22, load/store unit (LSU) 28 and floating-point unit (FPU) 32. Each of these three execution units may execute one or more classes of instructions, and all execution units operate concurrently during each processor cycle. FXU 22 performs fixed-point mathematical operations such as addition, subtraction, ANDing, ORing, and XORing, utilizing source operands received from specified general purpose registers (GPR) 24 or GPR rename buffers 25. Conversely, FPU 32 performs floating-point operations, such as floating-point multiplication and division, on source operands received from floating-point registers (FPR) 34 or FPR rename buffers 35. As its name implies, LSU 28 executes floating-point and fixed-point instructions which either load data from either data cache 16 or main memory into selected GPRs 24 or FPRs 34 or which store data from a selected one of GPRs 24, GPR rename buffers 25, FPRs 34, or FPR rename buffers 35 to memory.

Processor 10 employs both pipelining and out-of-order execution of instructions to further improve the performance of its superscalar architecture. Accordingly, instructions can be executed by FXU 22, LSU 28, and FPU 32 in any order as long as data dependencies are observed.

Figure 2:
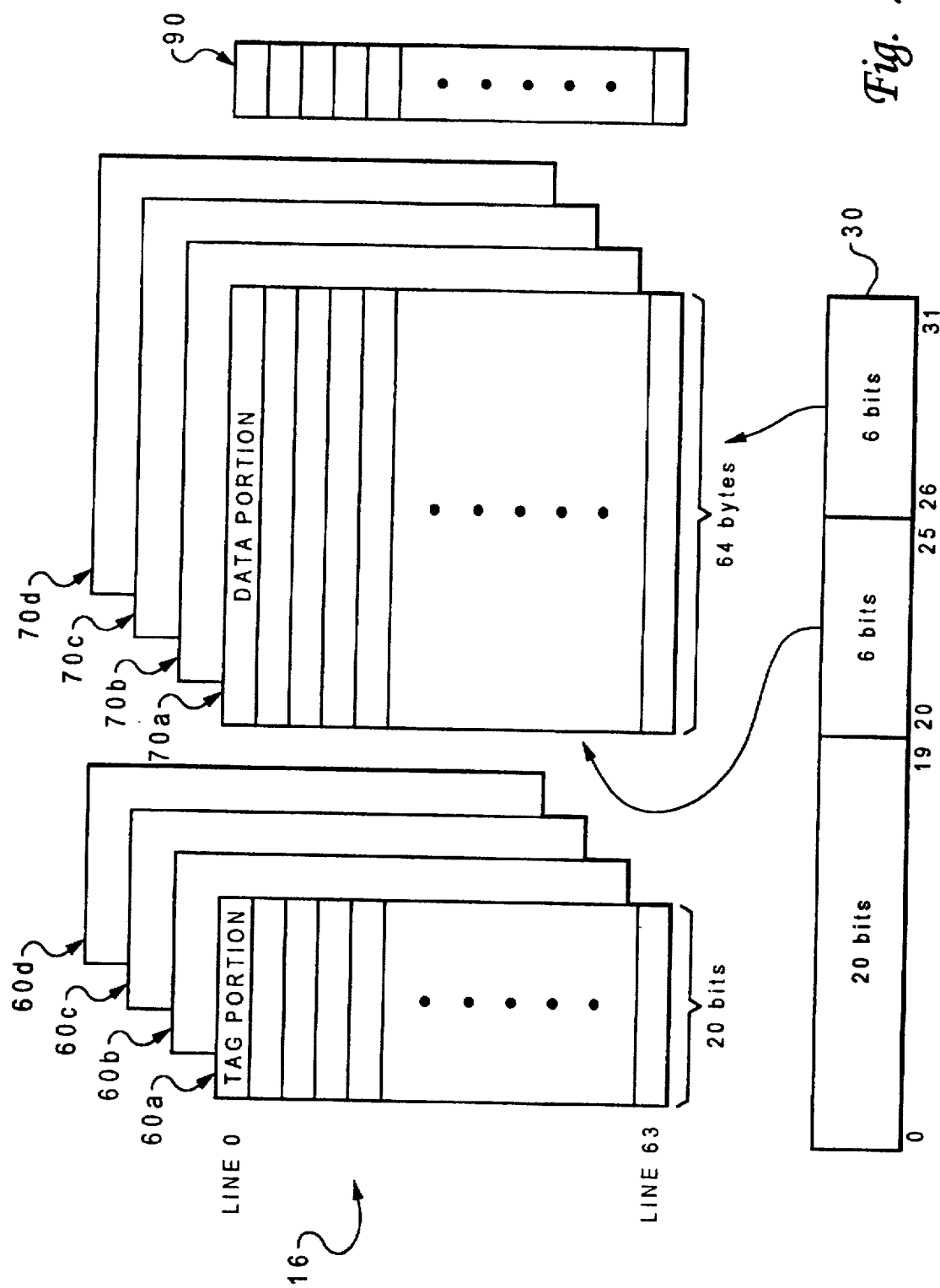
FIG. 2 is a block diagram of a cache memory within the processor of FIG. 1, according to an illustrative embodiment of the present disclosure.

With reference now to FIG. 2, there is depicted a block diagram of the organization of data cache 16 according to an illustrative embodiment of the disclosure. Data cache 16 is configured as a four-way cache—way 0, way 1, way 2, and way 3—with each way having 64 cache lines. In other words, each of the 64 cache lines can be looked upon as having four congruence ways. Each way of data cache 16 is further divided into two portions, namely a tag portion and a data portion. As shown in FIG. 2, the tag portion includes tag set 60a, tag set 60b, tag set 60c, and tag set 60d for way 0, way 1, way 2, and way 3, respectively. Similarly, the data portion includes data set 70a, data set 70b, data set 70c, and data set 70d for way 0, way 1, way 2, and way 3, respectively. Each of tag set 60a–60d corresponds to each of data set 70a–70d. Because all tag sets 60a–60d are of identical configuration and all data sets 70a–70d are of identical configuration, only tag set 60a and data set 70a will be described in detail as follows.

Each of tag set 60a and data set 70a has 64 cache lines, from line 0 to line 63, and each cache line is indexed by bits 20–25 of address 30. Each cache line of data set 70a is 64 bytes (or 16 words) wide while each cache line of tag set 60a is only 20 bits wide. Each cache line in data set 70a contains actual data that may be required by one of the processing units, FXU 22, FPU 32 or LSU 28, and each byte within the cache line is indexed by bits 26–31 of address 30. On the other hand, each cache line in tag set 60a contains an address tag that is utilized for comparison with bits 0–19 of address 30 in order to determine whether there is a cache "hit" or "miss." Incidentally, a match between an address tag in one of tag sets 60a–60d and bits 0–19 of address 30 means a cache "hit."

In addition to the tag portion and the data portion, each cache may also contain several other bits that are intended for various purposes. For example, there may be two state bits per cache line for implementing the four-state MESI (modified, exclusive, shared, and invalid) protocol. However, for the sake of simplicity along with the fact that the implementation of such bits is well known to those ordinarily skilled in the art of cache memory design, there is no need for further illustration of such bits in FIG. 2.

In implementing a four-way LRU mechanism within a four-way data cache 16 of FIG. 2, one embodiment is to have an LRU field 90 associated with each cache line in order to keep track of which one of tag sets 60a–60d (or corresponding data sets 70a–70d) for a particular cache line was access last. Thus, the state of utilization for all tag sets 60a–60d of each cache line must be recorded and stored in LRU field 90. Because there are four tag sets 60a–60d (four congruence sets or units), there must be four states—the least recently used, the second least recently used, the second most recently used, and the most recently used—denoted by LRU, LRU+1, MRU−1 and MRU respectively. In doing so, the state of utilization of each cache line in all four congruence sets will be known by simply interrogating LRU field 90 of that cache line.

Referring now to FIG. 3, there is illustrated an example of a true LRU scheme. In cycle a, way 1 of a cache line within data cache 16 is the LRU, way 0 of the same cache line within data cache 16 is the LRU+1, way 2 of the same cache line within data cache 16 is the MRU−1, and way 3 of the same cache line within data cache 16 is the MRU. In cycle b, after an access (either a read or a write) has previously been made in way 0 of the cache line, way 0 becomes the MRU, way 3 shifts down to be the MRU−1, and way 2 shifts down to be the LRU+1 while way 1 remains the LRU. In cycle c, after an access has previously been made again in way 0 of the cache line, there is no change to the state of each way of the cache line as to their order because way 0 is still the MRU. In cycle d, after an access has previously been made in way 3 of the cache line, way 3 becomes the MRU, way 0 shifts down to be the MRU−1, way 2 and way 1 remain the LRU+1 and LRU respectively. In cycle e, after an access has previously been made in way 1 of the cache line, way 1 becomes the MRU, way 3 shifts down to be the MRU−1, way 0 shifts down to the LRU+1, and way 2 becomes the LRU. Under this LRU scheme, the information within the cache line that is in the LRU will be replaced by new information obtained from the system memory when there is a linefill operation, usually induced by a cache "miss."

Referring now to FIG. 4a, there is illustrated a prior art implementation of a four-way LRU field. As shown, LRU field 80 comprises eight bits. Both bit 80-0 and bit 80-1 are for keeping track of the least recently used set among tag sets 60a–60d, and bits 80-0, 80-1 together contain the LRU set number. Similarly, both bit 80-2 and bit 80-3 are for keeping track of the second least recently used set among tag sets 60a–60d, and bits 80-2, 80-3 together contain the LRU+1 set number. Both bit 80-4 and bit 80-5 are for keeping track of the second most recently used set among tag sets 60a–60d, and bits 80-4, 80-5 together contain the MRU−1 set number. Finally, both bit 80-6 and bit 80-7 are for keeping track of the most recently used set among tag sets 60a–60d, and bits 80-6, 80-7 together contain the MRU set number.

With reference now to FIG. 4b, there is illustrated another prior art implementation of a four-way LRU field. As shown, LRU table 50 comprises six bits. As in the 8-bit LRU field of above, both bit 50-0 and bit 50-1 are for keeping track of the least recently used set among tag sets 60a–60d, and bits 50-0, 50-1 together contain the LRU set number. Similarly, both bit 50-2 and bit 50-3 are for keeping track of the second least recently used set among tag sets 60a–60d, and bits 50-2, 50-3 together contain the LRU+1 set number. Finally, both bit 50-4 and bit 50-5 are for keeping track of the second most recently used set among tag sets 60a–60d, and bits 50-4, 50-5 together contain the MRU−1 set number. In this implementation, the MRU set number is implicit such that it can be determined by analyzing the bits 50-0 through 50-5.

Referring now to FIG. 5, there is depicted an implementation of a four-way LRU field under an illustrative embodiment of the present disclosure. As shown, LRU table 90 comprises five bits. Both bit 90-0 and bit 90-1 are for keeping track of the least recently used set among tag sets 60a–60d, and bits 90-0, 90-1 together contain the LRU set number. Similarly, both bit 90-2 and bit 90-3 are for keeping track of the second least recently used set among tag sets 60a–60d, and bits 90-2, 90-3 together contain the set number of the LRU+1 set number. Bit 90-4 contains a bit for keeping track of the second most recently used set, MRU−1. As an illustrative embodiment, a "1" denotes the higher set number of the two remaining sets as the MRU−1 set, while a "0" denotes the lower set number of the two remaining sets as the MRU−1 set, although it is understood that a reverse assignment is also acceptable. Thus, bit 90-4 will be a "1" if the higher set number of the two remaining sets is the MRU−1. Conversely, bit 90-4 will be a "0" if the lower set number of the two remaining sets is the MRU−1. Finally, the MRU set number is again implicit as it can be determined to be the only remaining set.

With reference now to FIG. 6, there are depicted several examples for illustrating the application of the four-way LRU mechanism according to an illustrative embodiment of the disclosure.

In case 1, as illustrated at reference numeral 92: LRU is "00" means LRU set is set 0; LRU+1 is "01" means LRU+1 set is set 1. Because the MRU−1 bit is "1," this means the higher set number of the remaining two sets is the MRU−1. In this case, the two remaining sets are set 2 and set 3. The higher set number of the two is set 3; hence MRU−1 is set 3, which leaves the remaining set 2 as the MRU set.

In case 2, as illustrated at reference numeral 94: LRU is "00" means LRU set is set 0; LRU+1 is "01" means LRU+1 set is set 1. Because the MRU−1 bit is "0," this means the lower set number of the remaining two sets is the MRU−1. In this case, the remaining two sets are again set 2 and set 3. The lower set number of the two is set 2; hence MRU−1 is set 2, which leaves the remaining set 3 as the MRU set.

In case 3, as illustrated at reference numeral 96: LRU is "11" means LRU set is set 3; LRU+1 is "01" means LRU+1 set is set 1. Because the MRU−1 bit is "1," this means the higher set number of the remaining two sets is the MRU−1. In this case, the remaining two sets are set 0 and set 2. The higher set number of the two is set 2; hence MRU−1 is set 2, which leaves the remaining set 0 as the MRU set.

In case 4, as illustrated at reference numeral 98: LRU is "11" means LRU set is set 3; LRU+1 is "10" means LRU+1 set is set 2. Because the MRU−1 bit is "0," this means the lower set number of the two remaining sets is the MRU−1. In this case, the two remaining sets are set 0 and set 1. The lower set number of the two is set 0; hence MRU−1 is set 0, which leaves the remaining set 1 as the MRU set.

As described, this disclosure provides a method for implementing the four-way LRU mechanism in a high-performance data processing system with only five bits. Although only a four-way cache memory is utilized as an illustration in the present disclosure, it will be understood by those skilled in the art that the principal as illustrated may also be applicable to different cache memories having various numbers of ways and that less than (N−1)log₂N bits, where N=number of ways of the cache memory, are required to implement a LRU mechanism in those cache memories. Take an eight-way cache memory as an example, the first four sets of information, LRU, LRU+1, LRU+2 and LRU+3, may be tracked by twelve bits with three bits for each set. Then, the remaining four sets of information, MRU−3, MRU−2, MRU−1 and MRU, may be tracked by five bits, as illustrated above. Thus, the total bits required to implement a LRU mechanism for an eight-way cache memory, according to the present disclosure, is 17 bits. This is five bits less than the prior art requirement of (8−1)log₂8=21 bits.

In addition, the illustrative embodiment of the present disclosure can be conveniently represented by an empirical formula, as follows:

$$\sum_{k=1}^{x} N - 2^{k-1}$$

where x is preferably equal to log₂[number of ways of the cache memory] rounding up to a next highest integer.

While the disclosure has been particularly shown and described with reference to an illustrative embodiment, it will be understood by those skilled in the art that various changes in form and detail may be made therein without departing from the spirit and scope of the disclosure.

What is claimed is:

1. A method for implementing a least recently used cache line replacement scheme in a cache memory having units of information, said method comprising the steps of:

encoding least recently used cache line information for indicating an order of N number of said units by utilizing $$\sum_{k=1}^{x} N - 2^{k-1}$$

bits, wherein x=integer of (log₂N) and N≧4 and
using the encoded least recently used cache line information when replacing a cache line in the cache memory.

2. A method of implementing a least recently used cache line replacement scheme in a cache memory, said cache memory having a plurality of cache lines, wherein each cache line includes four congruence sets, said method further comprising the steps of:

- associating a least recently used (LRU) field with each of said plurality of cache lines within said cache memory, wherein each said LRU field includes five bits;
- storing a set number of a least recently used set among said four congruence sets in two bits of said LRU field associated with a corresponding one of said plurality of cache lines;
- storing a set number of a second least recently used set among said four congruence sets in another two bits of said LRU field associated with said corresponding one of said plurality of cache lines;
- setting a last bit of said LRU field to a state in response to a determination of a set number of a second most recently used set among said four congruence sets, wherein essential information for tracking said least recently used set is stored in minimal memory.

3. The method for implementing a least recently used cache line replacement scheme in a cache memory according to claim 2, said setting step further includes the step of setting said last bit of said LRU field to a logical "1" in response to a determination of said set number of said second most recently used set is higher than a set number of a most recently used set among said four congruence sets.

4. The method for implementing a least recently used cache line replacement scheme in a cache memory according to claim 2, said setting step further includes the step of setting said last bit of said LRU field to a logical "0" in response to a determination of said set number of said second most recently used set is lower than a set number of a most recently used set among said four congruence sets.

5. A cache memory having a four-way least recently used cache line replacement scheme, said cache memory having a plurality of cache lines, wherein each cache line includes four congruence sets, said cache memory comprising:

- means for associating a least recently used (LRU) field with each of said plurality of cache lines within said cache memory, wherein each said LRU field includes five bits;
- means for storing a set number of a least recently used set among said four congruence sets in two bits of said LRU field associated with a corresponding one of said plurality of cache lines;
- means for storing a set number of a second least recently used set among said four congruence sets in another two bits of said LRU field associated with said corresponding one of said plurality of cache lines;
- means for setting a last bit of said LRU field to a state in response to a determination of a set number of a second most recently used set among said four congruence sets, wherein minimal memory is needed to store essential information for tracking said least recently used set.

6. The cache memory having a four-way least recently used cache line replacement scheme according to claim 5, said means for setting further includes means for setting said last bit of said LRU field to a logical "1" in response to a determination of said set number of said second most recently used set is higher than a set number of a most recently used set among said four congruence sets.

7. The cache memory having a four-way least recently used cache line replacement scheme according to claim 5, said means for setting further includes means for setting said last bit of said LRU field to a logical "0" in response to a determination of said set number of said second most recently used set is lower than a set number of a most recently used set among said four congruence sets.

8. The cache memory having a four-way least recently used cache line replacement scheme according to claim 5, said cache memory is within a processor.

* * * * *

UNITED STATES PATENT AND TRADEMARK OFFICE
CERTIFICATE OF CORRECTION

PATENT NO. : 5,765,191
DATED : Jun. 9, 1998
INVENTOR(S) : *Loper et al.*

It is certified that error appears in the above-identified patent and that said Letters Patent is hereby corrected as shown below:

On the cover page of the patent, at [54], please correct the title of the invention by adding --DATA PROCESSING SYSTEMS-- after "HIGH-PERFORMANCE".

At the top of Col. 1, please correct the title by adding --DATA PROCESSING SYSTEMS-- after "HIGH-PERFORMANCE".

Signed and Sealed this

Nineteenth Day of January, 1999

Attest:

Attesting Officer

*Acting Commissioner of Patents and Trademarks*